(12) United States Patent
Ebert

(10) Patent No.: US 11,087,556 B2
(45) Date of Patent: Aug. 10, 2021

(54) TRANSFERRING A STATE BETWEEN VR ENVIRONMENTS

(71) Applicant: Siemens Healthcare GmbH, Erlangen (DE)

(72) Inventor: Anton Ebert, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/820,958

(22) Filed: Mar. 17, 2020

(65) Prior Publication Data

US 2020/0312035 A1 Oct. 1, 2020

(30) Foreign Application Priority Data

Mar. 26, 2019 (EP) ..................................... 19165281

(51) Int. Cl.
 *G06T 19/00* (2011.01)
 *G06F 16/28* (2019.01)

(52) U.S. Cl.
 CPC .......... *G06T 19/006* (2013.01); *G06F 16/289* (2019.01); *G06T 2219/024* (2013.01)

(58) Field of Classification Search
 None
 See application file for complete search history.

(56) References Cited

U.S. PATENT DOCUMENTS

| | | | | |
|---|---|---|---|---|
| 8,834,168 | B2 * | 9/2014 | Peters | H04N 13/161 434/219 |
| 10,068,380 | B2 * | 9/2018 | Chang | G06F 3/017 |
| 10,593,105 | B2 * | 3/2020 | Singh | G06F 3/011 |
| 10,916,222 | B2 * | 2/2021 | Zi | G09G 5/36 |
| 2010/0033484 | A1 * | 2/2010 | Kim | G06T 19/006 345/426 |
| 2016/0133230 | A1 * | 5/2016 | Daniels | G06T 19/006 345/633 |
| 2016/0284079 | A1 * | 9/2016 | Persely | G06T 7/0004 |
| 2017/0243403 | A1 * | 8/2017 | Daniels | G06T 19/20 |
| 2018/0268775 | A1 * | 9/2018 | Horneff | A63F 13/53 |
| 2018/0323972 | A1 * | 11/2018 | Reed | G06F 3/017 |
| 2018/0364717 | A1 * | 12/2018 | Douillard | G06K 9/00791 |
| 2019/0073832 | A1 * | 3/2019 | Kim | G06F 40/221 |
| 2019/0095729 | A1 * | 3/2019 | Dai | G06T 11/00 |

(Continued)

FOREIGN PATENT DOCUMENTS

EP 0982671 A2 3/2000

*Primary Examiner* — Robert J Craddock
(74) *Attorney, Agent, or Firm* — Harness, Dickey & Pierce, P.L.C.

(57) ABSTRACT

A method is for transferring a state from a first VR environment to a second VR environment. In an embodiment, the method includes receiving, via a receiving system, a static object dataset relating to an object, the object being represented in a first VR environment, generated by an input system, and in the second VR environment, generated by the receiving system. In addition, the sending system determines a first dynamic object dataset relating to the object, the first dynamic object dataset relating to a dynamic property of the object in a first VR environment. In addition, the first dynamic object dataset is transmitted from the sending system to the receiving system. In addition, the receiving system determines a first state of the second VR environment based upon the static object dataset and the first dynamic object dataset.

20 Claims, 6 Drawing Sheets

(56) References Cited

U.S. PATENT DOCUMENTS

2020/0060007 A1\* 2/2020 Harrison ................. G06T 15/08
2020/0066050 A1\* 2/2020 Ha ......................... G06Q 30/04
2021/0043011 A1\* 2/2021 Gates ...................... G06F 3/016

\* cited by examiner ered or claimed in connection with a method. The corresponding functional features of the method are embodied by corresponding object-related modules in this case.

TRANSFERRING A STATE BETWEEN VR ENVIRONMENTS

PRIORITY STATEMENT

The present application hereby claims priority under 35 U.S.C. § 119 to European patent application number EP 19165281.7 filed Mar. 26, 2019, the entire contents of which are hereby incorporated herein by reference.

FIELD

At least one embodiment of the invention generally relates to VR (virtual reality) or AR (augmented reality).

BACKGROUND

Uses based on VR (virtual reality) or AR (augmented reality) are widespread in numerous sectors of engineering.

In VR-based uses, the user is typically provided with a representation of a virtual environment, usually via a pair of glasses, where the representation depends on a position and/or orientation of the head of the user. In AR-based uses, the user is provided with a partial representation of a virtual environment, likewise usually via a pair of glasses, where in this representation, virtual objects are inserted into the real environment of the user.

Uses based on VR and AR arise in particular in the training and instruction of users. For example, users can use VR and AR to become familiar with a method or an apparatus without actually having to carry out the method or use the apparatus. Examples of such training uses are training in medical procedures or operating medical apparatuses.

It is invaluable especially for inexperienced users to have a template for a correct procedure of a method or correct operation of an apparatus. It is therefore advantageous to represent the actions of an experienced user for an inexperienced user in virtual reality, either in parallel with the actions of the experienced user, or as a recording.

If the representation of the actions of the experienced user is restricted to the field of view of the experienced user, the inexperienced users cannot perceive the environment fully in VR or AR, because, for instance, it is not possible to look around. In particular, the representation of the actions of the experienced user then differs from the actual training of the inexperienced user.

SUMMARY

At least one embodiment of the invention is directed to providing a way of transferring a VR environment between users.

Embodiments of the invention are directed to a method for determining a representation of an object in a second VR environment, a representation system, a computer program, a computer-readable storage medium, and/or a data structure. The claims and the description define advantageous developments.

The manner in which embodiments achieve the invention is described below both with reference to the claimed devices and with reference to the claimed method. Features, advantages or alternative embodiments mentioned in this connection can also be applied equally to the other claimed subject matter, and vice versa. In other words, the object-based claims (which claims are directed at a device, for example) can also be developed by combining with features described or claimed in connection with a method. The corresponding functional features of the method are embodied by corresponding object-related modules in this case.

At least one embodiment of the invention relates to a computer-implemented method for transferring a state from a first VR environment to a second VR environment, comprising receiving, via a receiving system, a static object dataset relating to an object, wherein the object can be represented in a first VR environment, which is generated by an input system, and in the second VR environment, which is generated by the receiving system. The method further comprises determining, via the sending system, a first dynamic object dataset relating to the object, wherein the first dynamic object dataset relates to a dynamic property of the object in the first VR environment, and transmitting the first dynamic object dataset from the sending system to the receiving system. The method further comprises determining, via the receiving system, a first state of the second VR environment on the basis of the static object dataset and the first dynamic object dataset. Optionally, the method can further comprise providing, via the receiving system, the first state of the VR environment, wherein the providing can comprise in particular displaying the VR environment in the first state.

At least one embodiment of the invention also relates to a transfer system for transferring a state from a first VR environment to a second VR environment, comprising:

sending system, designed to determine a first dynamic object dataset relating to an object, wherein the object can be represented in the first VR environment, which is generated by the sending system, wherein the first dynamic object dataset relates to a dynamic property of the object in the first VR environment; and receiving system, designed to receive a static object dataset relating to the object, wherein the object can be represented in the second VR environment, which is generated by the receiving system, additionally designed to determine a first state of the second VR environment on the basis of the static object dataset and the first dynamic object dataset, wherein the transfer system is additionally designed to transmit the first dynamic object dataset from the sending system to the receiving system.

At least one embodiment of the invention can also relate to a sending system, in particular for use in a transfer system for transferring a state from a first VR environment to a second VR environment, designed to determine a first dynamic object dataset relating to the object, wherein the object can be represented in the first VR environment, which is generated by the sending system, wherein the first dynamic object dataset relates to a dynamic property of the object in the first VR environment, also optionally designed to send a static object dataset relating to the object to the receiving system, wherein the object can be represented in the second VR environment, which is generated by the receiving system, and additionally designed to send the first dynamic object dataset to the receiving system.

At least one embodiment of the invention can also relate to a receiving system, in particular for use in a transfer system for transferring a state from a first VR environment to a second VR environment, designed to receive a static object dataset relating to an object, wherein the object can be represented in the second VR environment, which is generated by the receiving system, additionally designed to receive from a sending system a first dynamic object dataset relating to the object, wherein the object can be represented in the first VR environment, which is generated by the sending system, wherein the first dynamic object dataset relates to a dynamic property of the object in the first VR environment, additionally designed to determine a first state of the second VR environment on the basis of the static object dataset and the first dynamic object dataset.

The transfer system, the sending system, and the receiving system can be designed in particular to perform the above-described methods according to the invention and embodiments thereof. The transfer system is designed to perform these methods and embodiments thereof by virtue of the sending system and the receiving system being designed to perform the relevant method steps.

At least one embodiment of the invention also relates to a computer program product comprising a computer program and to a computer-readable medium. An implementation largely in software has the advantage that even transfer systems already in use can be easily upgraded by a software update in order to work in the manner according to the invention. The computer program product may comprise in addition to the computer program, if applicable, extra elements such as e.g. documentation and/or extra components, and also hardware components such as e.g. hardware keys (dongles etc.) for using the software.

At least one embodiment of the invention also relates to a computer-implemented data structure for use in a method for transferring a state from a first VR environment to a second VR environment, or in a representation system. The data structure comprises a static sub-data structure and a dynamic sub-data structure, wherein the static sub-data structure relates to static object datasets relating to objects, wherein the dynamic sub-data structure comprises dynamic object datasets relating to the objects, and wherein the state of a VR environment can be represented on the basis of the static object datasets and the dynamic object datasets.

At least one embodiment of the invention also relates to a computer-implemented method for determining a state of an object in a second VR environment, comprising receiving a static object dataset relating to the object, wherein the object can be represented in the second VR environment, which can be generated via a receiving system. The method further comprises receiving a first dynamic object dataset relating to the object, wherein the first dynamic object dataset relates to a dynamic property of the object in a first VR environment. The method further comprises determining a first state of the object in the second VR environment on the basis of the static object dataset and the first dynamic object dataset.

BRIEF DESCRIPTION OF THE DRAWINGS

The following description of the example embodiments, which are explained in greater detail in conjunction with the drawings, will clarify and elucidate the above-described properties, features and advantages of this invention, and the manner in which they are achieved. This description does not restrict the invention to these example embodiments. Identical components are denoted by the same reference signs in different figures, which are generally not shown to scale and in which.

DETAILED DESCRIPTION OF THE EXAMPLE EMBODIMENTS

Figure 1:
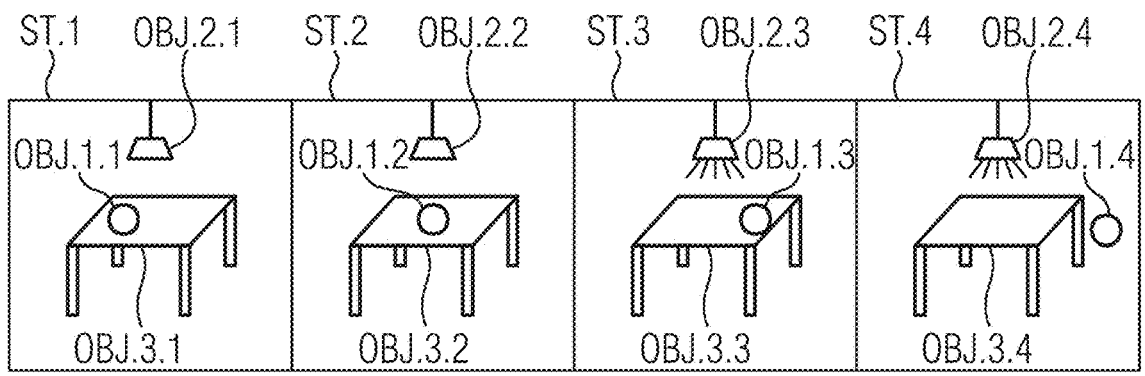
FIG. 1 shows different states of a VR environment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

At least one embodiment of the invention relates to a computer-implemented method for transferring a state from a first VR environment to a second VR environment, comprising receiving, via a receiving system, a static object dataset relating to an object, wherein the object can be represented in a first VR environment, which is generated by an input system, and in the second VR environment, which is generated by the receiving system. The method further comprises determining, via the sending system, a first dynamic object dataset relating to the object, wherein the first dynamic object dataset relates to a dynamic property of the object in the first VR environment, and transmitting the first dynamic object dataset from the sending system to the receiving system. The method further comprises determining, via the receiving system, a first state of the second VR environment on the basis of the static object dataset and the first dynamic object dataset. Optionally, the method can further comprise providing, via the receiving system, the first state of the VR environment, wherein the providing can comprise in particular displaying the VR environment in the first state.

In particular, the static object dataset is received in this process via an interface of the receiving system. In addition, the first object dataset is determined in particular via a processing unit of the sending system. In addition, the first dynamic object dataset is transmitted in particular from an interface of the sending system to the interface of the receiving system. In addition, the first state of the second VR environment is determined in particular via a processing unit of the receiving system. The optional providing can be performed in particular by an output unit of the receiving system.

The term VR (acronym for virtual reality) in particular refers to the representation of an interactive virtual environment that is computer-generated in real time for perception by a user. In particular, the virtual environment is modeled on an actual environment. It is particularly the case for virtual reality that the user is embedded; in particular it may no longer be possible for the user to perceive the actual reality (the technical term is "immersion"). Furthermore, the user is able in particular to interact with the virtual world and alter this virtual world.

The term "VR system" in particular refers to a system for representing a virtual environment for a user. In particular, the sending system and/or the receiving system is a VR system.

The term "VR environment" in particular refers to a virtual environment represented by a VR system. A VR environment can be adapted in particular to the VR system performing the representation; for instance different VR systems can display a VR environment in different levels of detail or at different resolutions.

An object is in particular an entity which can be represented in a VR environment. In particular, an object can be defined by a set of further objects. In particular, a VR environment can be defined in full by a set of objects. Examples of objects are things, walls, rooms, people or controls that are represented, or can be represented, in a VR environment. "Asset" is a technical term for object.

An object can have a set of properties, which describe or define the appearance or the behavior of the object. Examples of such properties include, inter alia, a 3D model of an object, textures of an object, the position of an object in the VR environment, the orientation of the object, a state of the object, the response of the object to external influences.

A state of an object is in particular the sum of the properties of the object in a VR environment, in particular the representation of the object in a VR environment.

The inventor has found that, on the basis of separating the description of an object into a static object dataset and into a dynamic object dataset, the typically memory-intensive static object datasets need to be transferred separately and in particular only once. Since dynamic object datasets are typically less memory-intensive, they can be transferred more frequently for a given bandwidth. In particular, it is possible to transfer the dynamic object datasets in a data stream (or "stream" for short), in particular in a live datastream, and thereby also make it possible to stream or live-stream an entire VR environment.

According to a further embodiment of the invention, determining the first state of the second VR environment comprises determining, via the receiving system, in particular via a processing unit of the receiving system, a first representation of the object in the second VR environment on the basis of the static object dataset and the first dynamic object dataset.

The inventor has found that the first state of the VR environment can be determined particularly efficiently by determining the first representation of the object.

According to a further embodiment of the invention, the method further comprises determining, via the sending system, in particular via a processing unit of the sending system, a representation of the object in the first VR environment.

The inventor has found that by the representation of the object in the first VR environment and in the second VR environment, both the user of the sending system and the user of the receiving system can perceive a representation of the object. This joint representation can then be used in particular for demonstrating the object.

According to another possible embodiment of the invention, the sending system comprises a first pair of video glasses, and/or the second sending system comprises a second pair of video glasses. A technical term for video glasses is "head-mountable display" or "head-mounted display".

The inventor has found that video glasses are particularly well-suited to the representation of VR environments. Furthermore, video glasses are usually designed to be wireless and therefore the data transfer rates of video glasses are limited. The method can therefore be employed in particular advantageously with video glasses, because the method according to the invention minimizes the data to be transferred.

According to a further embodiment of the invention, the method further comprises determining, via the sending system, a second dynamic object dataset relating to the object, wherein the first dynamic object dataset relates to the dynamic property of the object at a first time instant in the first VR environment, and wherein the second dynamic object dataset relates to the dynamic property of the object at a second time instant in the first VR environment. The method further comprises transmitting the second dynamic object dataset from the sending system to the receiving system, and determining, via the receiving system, a second state of the second VR environment on the basis of the static object dataset and the second dynamic object dataset. Optionally, the method can further comprise providing, via the receiving system, the second state of the VR environment, wherein the providing can comprise in particular displaying the VR environment in the second state.

The second dynamic object dataset is determined here in particular via the processing unit of the sending system. The second dynamic object dataset is transmitted from the sending system to the receiving system in particular via an interface of the sending system and via an interface of the receiving system.

The inventors have found that by transmitting the second dynamic object dataset, the state of the second VR environment can be updated without transferring again the memory-intensive static object dataset. In particular, the representation can be updated by transmitting a dataset that is small compared with information describing the object in full.

According to a further embodiment of the invention, determining the second state of the second VR environment comprises determining, via the receiving system, in particular via the processing unit of the receiving system, a second representation of the object in the second VR environment on the basis of the static object dataset and the second dynamic object dataset.

The inventor has found that the second state of the VR environment can be determined particularly efficiently by determining the second representation of the object.

According to a further embodiment of the invention, the method further comprises detecting a change in the dynamic property of the object, wherein the second dynamic object dataset is determined in response to the detection of the change in the dynamic property of the object. The change can be detected here in particular via the processing unit of the sending system.

The inventor has found that by determining the second dynamic object dataset only in response to a detected change, the dynamic object dataset needs to be ascertained and transferred far less frequently. This means that to implement the method requires less processing capacity of the sending system and/or transfer capacity between sending system and receiving system than if the dynamic object dataset were determined and transferred, for instance, at regular time intervals.

According to a further embodiment of the invention, the detecting is performed repeatedly at a constant time interval. In other words, the detecting is performed repeatedly at a constant sampling rate. In particular, the constant detection rate is the inverse value of the constant time interval. Another term for sampling rate is "frame rate" in the art.

In particular, the constant time interval can be transmitted from the receiving system to the sending system.

The inventor has found that by detecting at a constant time interval, i.e. at a constant sampling rate, it is possible to adjust the number of transfers of the dynamic object dataset to suit the technical limitations of the sending system, of the receiving system, and/or of the data connection between the sending system and the receiving system.

According to a further embodiment of the invention, the dynamic property of the object can be changed by an interaction of a user with the first VR environment, in particular by a user of the sending system interacting with the first VR environment via the sending system, or rather via an input unit of the sending system. In particular, a dynamic property of an object is a property of the object that can be changed by a user interacting with the first VR environment, in particular by a user of the sending system interacting with the first VR environment via the sending system, or rather via the input unit of the sending system.

The inventor has found that the object properties that can be altered by the user are those properties that can change regularly and dynamically in a VR environment. Therefore, a VR environment can be transferred particularly efficiently by defining and transferring as dynamic properties, the object properties that can be altered by the user.

According to a further embodiment of the invention, the dynamic property of the object relates to at least one of the following properties of the object: position and/or orientation of the object, visibility of the object, link between the object and another object, light parameter of the object.

The position of an object can be specified in particular by a coordinate vector, in particular by a three-dimensional coordinate vector. Cartesian coordinates, polar coordinates or spherical coordinates can be used for this purpose. The origin of the coordinate system can be spatially fixed with respect to the first VR environment and/or with respect to the second VR environment; alternatively the origin of the coordinate system can be based also on a user-position in the first VR environment. The orientation of an object can likewise be specified by a three-dimensional vector, or by stating Euler angles.

The visibility of an object defines in particular whether an object is displayed in a VR environment. The visibility of an object can be specified in particular by a binary value.

A first object can be linked to a second object in order to be able to derive dynamic properties of the first object from dynamic properties of the second object. In particular, the position and/or orientation of the first object can be given by the position and/or orientation of the second object.

A light parameter of an object can specify in particular whether an object is actively emitting light, and/or how an object behaves under illumination. The light parameter of an object can comprise in particular whether the object is emitting light, in what spatial direction and at what intensity the object is emitting light, and/or other properties (e.g. wavelength, color) of the emitted light. The light parameter can also relate to whether, and at what intensity, the object reflects light (e.g. specular reflection, diffuse reflection).

The inventor has found that the aforementioned properties are altered particularly frequently by interaction with a user, and also that the properties can be described in particular by small amounts of data. For example, only three numbers are needed to specify the position or the orientation, just a binary value is needed to specify the visibility of the object, specifying a link to another object requires just the identifier of the other object, and there are only one or two numbers (for instance light intensity and light color) needed for the light parameter.

According to a further embodiment of the invention, the static object dataset relates to at least one static property of the object, wherein the static property of the object cannot be changed by an interaction of a user with the first VR environment, in particular cannot be changed by a user of the sending system interacting with the first VR environment via the sending system, or rather via an input unit of the sending system. In particular, a static property of an object is a property of the object that cannot be changed by a user interacting with the first VR environment, in particular cannot be changed by a user of the sending system interacting with the first VR environment via the sending system, or rather via the input unit of the sending system.

The inventor has found that the object properties that cannot be altered by the user are those properties that do not change in a VR environment. Therefore, a VR environment can be transferred particularly efficiently by defining and transferring only once as static properties, the object properties that cannot be altered by the user.

According to a further embodiment of the invention, the static property relates to at least one of the following properties of the object: three-dimensional model of the object, one or more textures of the object, constant physical property of the object.

A three-dimensional model of the object in particular is a representation of the object based on a collection of points in three-dimensional space, where the points can be characterized in particular by three-dimensional coordinates, and the points are connected in particular by geometric objects such as triangles, polygons, lines or curved surfaces. A three-dimensional model can be created in particular by hand, by algorithms or by scanning an actual object.

A texture is in particular a two-dimensional image that can be represented on the surface of a three-dimensional virtual object. In particular, this can involve transforming the two-dimensional image (the technical term is "texture mapping"). In particular in this process, it may be necessary to interpolate values of the associated two-dimensional image.

A constant physical property of an object is in particular a property that influences the motion of the object yet does not vary over time. Examples of such constant physical properties of objects are the mass of an object (where the mass determines the acceleration of the object resulting from an applied force), the inertia tensor of an object, which defines the response of the object to an applied torque, or elastic constants (bulk modulus, Young's modulus, shear modulus, Poisson's ratio, longitudinal modulus, Lamé constant) of an object, which determine the deformation of an object as a result of applied forces.

The inventors have found that these properties in particular cannot be altered by the user, while at the same can be described only by large volumes of data. It is therefore particularly advantageous to transfer these properties as a static object dataset. For example, the three-dimensional model is described by a number of points, which number is proportional to the product of the surface area or the volume of the object and the surface resolution or the volumetric resolution respectively of the object. A texture is described by a number of pixels, which number is proportional to the surface area of the object and the surface resolution of the texture.

According to a further embodiment of the invention, the method further comprises receiving, via the sending system, a first virtual user-position of a user in the first VR environment, transmitting the first virtual user-position from the sending system to the receiving system, and determining a second virtual user-position of a user in the second VR environment on the basis of the first user-position, wherein determining the first representation and/or the second representation of the object is additionally based on the second user-position. A user-position can comprise in particular a position and/or an orientation.

The inventor has found that by transferring the position of the user in the first VR environment, it is also possible to adjust the position of the user in the second VR environment. In particular, it is hence possible to display the second VR environment from the correct perspective.

According to a further embodiment of the invention, the second virtual user-position is the user-position in the second VR environment that is equivalent to the first virtual user-position. The inventor has found that by using an equivalent user-position, the representation of the user of the sending system can be transferred particularly accurately.

According to a further embodiment of the invention, the second virtual user-position is the user-position in the second VR environment that is offset from the first virtual user-position by a constant value. The inventor has found that additional advantageous perspectives (for instance a view over the shoulder or observation from the front) can be achieved by an offset in the user-position.

According to a further embodiment of the invention, determining the first representation and/or determining the second representation comprises rendering the object.

Rendering an object in particular is generating the image of the object from raw data. In this process, the raw data in particular can relate to static and dynamic properties of the object. Another word for "rendering" is "image synthesis".

The inventor has found that rendering from within the receiving system means that less data must be transferred between the sending system and the receiving system. In addition, the accuracy of the rendering can thereby be adapted to the processing capacity of the receiving system.

According to a further embodiment of the invention, the method further comprises sending, via the receiving system, a technical parameter of the receiving system to a server, wherein the static property is adapted to the technical parameter of the receiving system. The technical parameter is sent in particular via the interface of the receiving system.

A technical parameter of the receiving system is in particular a parameter that describes the capability of the receiving system to determine a representation. Examples of the technical parameter are a processing capacity (in particular of a processor or of a graphics processor of the receiving system) or memory capacity (in particular of a memory unit, a cache of the processor or a cache of the graphics processor of the receiving system).

The inventor has found that by adapting the static object parameter to the technical parameter, it is possible to take account of the performance of the receiving system without changing the data sent from the sending system. In particular, the data sent from the sending system can be processed by different receiving systems having different performances.

According to a further embodiment of the invention, the method further comprises determining an identifier of an object via the sending system, transmitting the identifier of the object from the sending system to the receiving system, and sending the identifier of the object to a server, wherein receiving the static object dataset is carried out in response to sending the identifier of the object.

The inventor has found that by transmitting the identifier before receiving the static object dataset, the receiving system can be informed of which objects must be used for the representation of the second VR environment. The receiving system can then be provided with the static object datasets for these required objects. As a result, there is no need to retrieve proactively all the available static object datasets, nor is it necessary to retrieve static object datasets subsequently during the representation of the passage of time in the second VR environment. This not only reduces the amount of data to be transferred but also prevents time delays in the representation of the passage of time in the second environment.

According to a further embodiment of the invention, the method further comprises sending a frame refresh rate from the receiving system to the sending system, wherein the sending system transmits dynamic object datasets to the receiving system at the frame refresh rate.

A frame refresh rate is in particular a frequency of frames which is displayed by the sending system or by the receiving system in order to imitate a time-continuous video. Another term for "frame refresh rate" is "frame refresh frequency". The sending system in particular can transmit dynamic object datasets to the receiving system at a given frame refresh rate by transmitting one or more new dynamic object datasets after each time period, wherein the time period is the reciprocal of the frame refresh rate.

The inventors have found that the sending system can be informed of the maximum frame refresh rate of the receiving system by the transmission of the frame refresh rate from the receiving system to the sending system. The sending system can thereby reduce its frame refresh rate, if applicable, to the frame refresh rate specified by the receiving system. In particular, this can reduce the outstanding amount of data. This advantage is particularly effective when the method is used for streaming.

According to a further embodiment of the invention, the first dynamic object dataset and/or the second dynamic object dataset comprises an item of time information, wherein determining the first state and/or the second state of the second VR environment is based on dynamic object datasets relating to different items of time information.

At least one embodiment of the invention also relates to a transfer system for transferring a state from a first VR environment to a second VR environment, comprising:

sending system, designed to determine a first dynamic object dataset relating to an object, wherein the object can be represented in the first VR environment, which is generated by the sending system, wherein the first dynamic object dataset relates to a dynamic property of the object in the first VR environment; and receiving system, designed to receive a static object dataset relating to the object, wherein the object can be represented in the second VR environment, which is generated by the receiving system, additionally designed to determine a first state of the second VR environment on the basis of the static object dataset and the first dynamic object dataset, wherein the transfer system is additionally designed to transmit the first dynamic object dataset from the sending system to the receiving system.

At least one embodiment of the invention can also relate to a sending system, in particular for use in a transfer system for transferring a state from a first VR environment to a second VR environment, designed to determine a first dynamic object dataset relating to the object, wherein the object can be represented in the first VR environment, which is generated by the sending system, wherein the first dynamic object dataset relates to a dynamic property of the object in the first VR environment, also optionally designed to send a static object dataset relating to the object to the receiving system, wherein the object can be represented in the second VR environment, which is generated by the receiving system, and additionally designed to send the first dynamic object dataset to the receiving system.

At least one embodiment of the invention can also relate to a receiving system, in particular for use in a transfer system for transferring a state from a first VR environment to a second VR environment, designed to receive a static object dataset relating to an object, wherein the object can be represented in the second VR environment, which is generated by the receiving system, additionally designed to receive from a sending system a first dynamic object dataset relating to the object, wherein the object can be represented in the first VR environment, which is generated by the sending system, wherein the first dynamic object dataset relates to a dynamic property of the object in the first VR environment, additionally designed to determine a first state of the second VR environment on the basis of the static object dataset and the first dynamic object dataset.

The transfer system, the sending system, and the receiving system can be designed in particular to perform the above-described methods according to the invention and embodiments thereof. The transfer system is designed to perform these methods and embodiments thereof by virtue of the sending system and the receiving system being designed to perform the relevant method steps.

At least one embodiment of the invention also relates to a computer program product comprising a computer program and to a computer-readable medium. An implementation largely in software has the advantage that even transfer systems already in use can be easily upgraded by a software update in order to work in the manner according to the invention. The computer program product may comprise in addition to the computer program, if applicable, extra elements such as e.g. documentation and/or extra components, and also hardware components such as e.g. hardware keys (dongles etc.) for using the software.

At least one embodiment of the invention also relates to a computer-implemented data structure for use in a method for transferring a state from a first VR environment to a second VR environment, or in a representation system. The data structure comprises a static sub-data structure and a dynamic sub-data structure, wherein the static sub-data structure relates to static object datasets relating to objects, wherein the dynamic sub-data structure comprises dynamic object datasets relating to the objects, and wherein the state of a VR environment can be represented on the basis of the static object datasets and the dynamic object datasets.

The inventor has found that this data structure achieves the advantages already stated above for the method for transferring a state.

According to a further embodiment of the invention, the static sub-data structure and the dynamic sub-data structure can be transferred independently of one another.

The inventor has found that by using static and dynamic sub-data structures that can be transferred independently of one another, the data structure can be used in particular for live streaming by transferring the static sub-data structure before the start of the live streaming, and by being able to send the dynamic sub-data structures during the live streaming.

According to a further embodiment of the invention, the static sub-data structure comprises an object list, wherein each element of the object list comprises an identifier of an object, and at least one static object dataset relating to the object and/or at least one link to a static object dataset relating to the object. In this case, a static object dataset relating to an object comprises at least one static property of the object, wherein the static property of the object cannot be changed by an interaction of a user with a VR environment.

According to a further embodiment of the invention, the dynamic sub-data structure comprises an event list, wherein each element of the event list comprises an item of time information, an identifier of an object, and at least one dynamic object dataset relating to the object. In particular, a dynamic property relating to an object can be changed by an interaction of a user with a VR environment.

According to a further embodiment of the invention, it holds for each pair comprising a first element in the event list and a second element in the event list, that the dynamic object dataset of the first element differs from the dynamic object dataset of the second element if the identifier of the object of the first element is the same as the identifier of the object of the second element, and if there is no third element in the event list that comprises an item of time information between the time information of the first element and the time information of the second element and has the identifier of the object of the first element.

At least one embodiment of the invention also relates to a computer-implemented method for determining a state of an object in a second VR environment, comprising receiving a static object dataset relating to the object, wherein the object can be represented in the second VR environment, which can be generated via a receiving system. The method further comprises receiving a first dynamic object dataset relating to the object, wherein the first dynamic object dataset relates to a dynamic property of the object in a first VR environment. The method further comprises determining a first state of the object in the second VR environment on the basis of the static object dataset and the first dynamic object dataset.

The individual steps of the described method are implemented in particular via the receiving system. The method for determining a state of an object in a second VR environment is in particular the part of the method for transferring the state of the object from a first VR environment to the second VR environment that is implemented in the receiving system. The method for determining the state of the object can therefore include in particular all the advantageous embodiments and developments of the method for transferring the state.

According to a further possible embodiment of the invention, the method for determining a state of an object in a second VR environment further comprises receiving a second dynamic object dataset relating to the object, wherein the first dynamic object dataset relates to the dynamic property of the object at a first time instant in the first VR environment, and wherein the second dynamic object dataset relates to the dynamic property of the object at a second time instant in the first VR environment. The method for determining a state of an object in a second VR environment further comprises determining a second state of the second VR environment on the basis of the static object dataset and the second dynamic object dataset.

According to a further possible embodiment of the invention, in the method for determining a state of an object in a second VR environment, the dynamic property of the object can be changed by an interaction of a user with the first VR environment.

According to a further possible embodiment of the invention, in the method for determining a state of an object in a second VR environment, the dynamic property of the object relates to at least one of the following properties of the object: position and/or orientation of the object, visibility of the object, link between the object and another object, and/or light parameter of the object.

According to a further possible embodiment of the invention, in the method for determining a state of an object in a second VR environment, the static object dataset relates to at least one static property of the object, wherein the static property of the object cannot be changed by an interaction of a user with the first VR environment.

According to a further possible embodiment of the invention, in the method for determining a state of an object in a second VR environment, the static property relates to at least one of the following properties of the object: a three-dimensional model of the object, one or more textures of the object, and/or a constant physical property of the object.

According to a further possible embodiment of the invention, the method for determining a state of an object in a second VR environment further comprises receiving a first virtual user-position of a user in the first VR environment, and determining a second virtual user-position of a user in the second VR environment on the basis of the first user-position, wherein determining the first state and/or the second state of the second VR environment is additionally based on the second user-position.

According to a further possible embodiment of the invention, in the method for determining a state of an object in a second VR environment, determining the first state and/or determining the second state of the second VR environment comprises rendering the object.

According to a further possible embodiment of the invention, the method for determining a state of an object in a second VR environment additionally comprises sending a technical parameter of the receiving system to a server, wherein the static object dataset is adapted to the technical parameter of the receiving system.

According to a further possible embodiment of the invention, the method for determining a state of an object in a second VR environment further comprises receiving an identifier of the object, and sending the identifier of the object to a server, wherein receiving the static object dataset is carried out in response to sending the identifier of the object.

FIG. 1 shows different states ST.1, . . . , ST.4 of a VR environment. The VR environment may be the first VR environment or the second VR environment. The states ST.1, . . . , ST.4 can also be regarded as frames (also referred to as video frames) from a passage of time in the VR environment.

In the example embodiment shown, the VR environment comprises a ball as the first object OBJ.1, a lamp as the second object OBJ.2, and a table as the third object OBJ.3.

Between the individual states ST.1, . . . , ST.4 of the VR environment, the first object OBJ.1 moves and therefore has different positions and/or velocities, and hence is characterized by different dynamic properties in the individual states ST.1, . . . , ST.4 of the VR environment.

The second object OBJ.2 does not emit any light in the first state ST.1 or the second state ST.2 of the VR environment, whereas it emits light in the third state ST.3 and the fourth state ST.4 of the VR environment. Thus the lamp has different light parameters, and is therefore characterized in the first two states ST.1, ST.2 by other dynamic properties than in the second two states ST.3, ST.4.

The third object OBJ.3 does not change its dynamic properties between the states ST.1, . . . , ST.4 of the VR environment.

Figure 2:
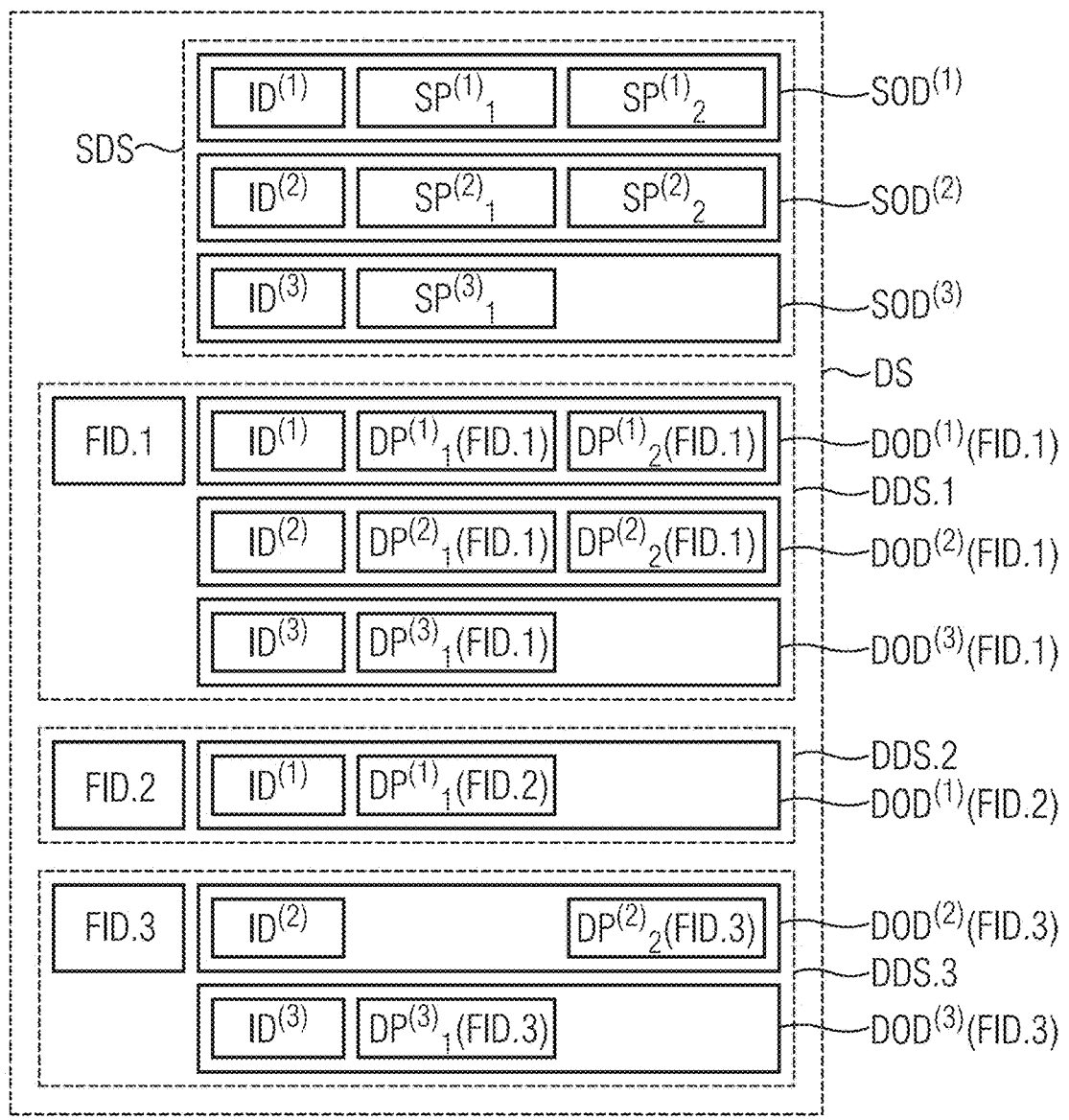
FIG. 2 shows a data structure comprising a static sub-data structure and a plurality of dynamic sub-data structures.

FIG. 2 shows a data structure DS comprising a static sub-data structure SDS and a plurality of dynamic sub-data structures DDS.1, DDS.2, DDS.3. In this figure, the static sub-data structure SDS comprises static object datasets $SOD^{(1)}$, $SOD^{(2)}$, $SOD^{(3)}$, and the dynamic sub-data structures DDS.1, DDS.2, DDS.3 comprise dynamic object datasets $DOD^{(1)}$ (FID.1), $DOD^{(2)}$ (FID.1), $DOD^{(3)}$ (FID.1), $DOD^{(1)}$ (FID.2), $DOD^{(2)}$ (FID.3), $DOD^{(3)}$ (FID.3). The data structure DS is based on the VR environment shown in FIG. 1, or the statuses thereof, but is not an exact reproduction thereof.

The static object datasets $SOD^{(1)}, \ldots, SOD^{(3)}$ here each comprise an identifier $ID^{(1)}, ID^{(2)}, ID^{(3)}$ of an object and one or more static properties $SP^{(1)}_1, SP^{(1)}_2, SP^{(2)}_1, SP^{(2)}_2, SP^{(3)}_1$ of the respective objects OBJ.1, ..., OBJ.3. (The convention used here is that the static object datasets $SOD^{(i)}$ relate to the object OBJ.1, ..., OBJ.3 having the identifier $ID^{(i)}$, and comprise the identifier $ID^{(i)}$ and one or more static properties $SP^{(i)}_j$.) The identifier $ID^{(1)}, \ldots, ID^{(3)}$ of an object may be in particular a unique number or character string assigned to the object OBJ.1, ..., OBJ.3. The static properties $SP^{(1)}_1, \ldots, SP^{(3)}_1$ are here properties of the associated object OBJ.1, ..., OBJ.3, which properties cannot be changed by an interaction of a user with the first VR environment. For example, the static property $SP^{(1)}$ relates to the three-dimensional model of the object OBJ.1 having the identifier $ID^{(1)}$, the static property $SP^{(2)}_2$ may relate to one or more textures of the object OBJ.2 having the identifier $ID^{(2)}$, and the static property $SP^{(3)}_1$ may relate to a constant physical property of the object OBJ.3 having the identifier $ID^{(3)}$, for instance the mass of the object OBJ.1, ..., OBJ.3.

In this example embodiment, the dynamic sub-data structures DDS.1, ..., DDS.3 each describe a frame; in other words the dynamic object datasets $DOD()$ (FID.1), ..., $DOD^{(3)}$ (FID.3) are arranged in frames. In this example, a first dynamic sub-data structure DDS.1 comprises the dynamic object datasets $DOD^{(1)}$ (FID.1), ..., $DOD^{(3)}$ (FID.1), a second dynamic sub-data structure DDS.2 comprises the dynamic object dataset $DOD^{(1)}$(FID.2), and a third dynamic sub-data structure DDS.3 comprises the dynamic object datasets $DOD^{(2)}$(FID.3), $DOD^{(3)}$ (FID.3). (The convention used here is that the dynamic sub-data structure DDS.k comprises dynamic object datasets $DOD^{(i)}$ (FID.k).)

The dynamic sub-data structures DDS.1, ..., DDS.3 additionally comprise an identifier FID.1, ..., FID.3 of the frame that they describe. The identifier FID.1, ..., FID.3 of the frame in particular can be an integer, or a floating-point number that denotes the time coordinate of the particular frame.

The individual dynamic object datasets $DOD^{(1)}$ (FID.1), ..., $DOD^{(3)}$ (FID.3) each comprise an identifier $ID^{(1)}, ID^{(2)}, ID^{(3)}$ of an object OBJ.1, ..., OBJ.3 and one or more dynamic properties $DP^{(1)}_1$ (FID.1), $DP^{(1)}_2$ (FID.1), $DP^{(2)}_1$ (FID.1), $DP^{(2)}_2$ (FID.1), $DP^{(3)}_1$ (FID.1), $DP^{(1)}_1$ (FID.2), $DP^{(2)}_2$ (FID.3), $DP^{(3)}_1$ (FID.3). For example, the dynamic object dataset $DOD^{(1)}$ (FID.1) comprises the identifier $ID^{(1)}$ of the first object OBJ.1 and two dynamic properties $DP^{(1)}_1$ (FID.1), $DP^{(1)}_2$ (FID.1). Given that the two dynamic properties $DP^{(1)}_1$ (FID.1), $DP^{(1)}_2$ (FID.1) and the identifier $ID^{(1)}$ of the first object OBJ.1 are elements of the same dynamic object dataset $DOD^{(1)}$ (FID.1), then this means that the two dynamic properties $DP^{(1)}_1$ (FID.1), $DP^{(1)}_2$ (FID.1) are dynamic properties of the first object OBJ.1 having the identifier $ID^{(1)}$ in the frame having the identifier FID.1. (The convention used here is that the dynamic property $DP^{(i)}_j$(FID.k) is the jth dynamic property of the object OBJ.1, ..., OBJ.3 having the identifier $ID^{(i)}$ in the frame having the identifier FID.k.)

In this example embodiment, the dynamic properties $DP^{(1)}_1$ (FID.1), ..., $DP^{(3)}_1$ (FID.3) of the objects OBJ.1, ..., OBJ.3 can be changed by an interaction of a user with the first VR environment. For example, a dynamic property $DP^{(1)}_1$ (FID.1), ..., $DP^{(3)}_1$ (FID.3) can relate to, or define, the position of the object OBJ.1, ..., OBJ.3, the orientation of the object, the visibility of the object OBJ.1, ..., OBJ.3, the link between the object OBJ.1, ..., OBJ.3 and another object OBJ.1, ..., OBJ.3, and/or light parameters of the object OBJ.1, ..., OBJ.3.

TABLE A

Pseudocode for FIG. 2

| | |
|---|---|
| A.1 | <header> |
| A.2 |   <object id=1 mod=ball.3d texture=rubber_red.tx /> |
| A.3 |   <object id=2 mod=lamp.3d texture=cloth_blue.tx /> |
| A.4 |   <object id=3 mod=table.3d /> |
| A.5 | </header> |
| A.6 | <body> |
| A.7 |   <frame id=0> |
| A.8 |     <object id=1 pos= (0.0,0.0,0.0) vel=(1.0,0.0,0.0)/> |
| A.9 |     <object id=2 pos= (0.0,0.0,1.0) light = 0 /> |
| A.10 |     <object id=3 pos= (0.0,0.0,-1.0) /> |
| A.11 |   </frame> |
| A.12 |   <frame id=50> |
| A.13 |     <object id=1 pos= (1.0,0.0,0.0)/> |
| A.14 |   </frame> |
| A.15 |   <frame id=100> |
| A.16 |     <object id=2 light=1 /> |
| A.17 |     <object id=3 pos= (0.0,0.0, -1.0) /> |
| A.18 |   </frame> |
| A.19 | </body> |

Table A shows a translation of the example embodiment shown in FIG. 2 of a data structure A into an XML-like pseudocode. Rows A.1 to A.5 show the static sub-data structure SDS, and rows A.6 to A.19 show the dynamic sub-data structures DDS.1, ..., DDS.3. The first dynamic sub-data structure DDS.1 is shown in rows A.7 to A.11, the second dynamic sub-data structure DDS.2 is shown in rows A.12 to A.14, and the third dynamic sub-data structure DDS.3 is shown in rows A.15 to A.18.

The first static object dataset $SOD^{(1)}$ is defined in row A.2. It comprises the identifier $ID^{(1)}$ ("id=1") of the first object OBJ.1, and two static properties $SP^{(1)}_1, SP^{(1)}_2$, where the first of the two static properties $SP^{(1)}_1, SP^{(1)}_2$ is a file name ("mod=ball.3d") of a three-dimensional model of the first object OBJ.1, and where the second of the two static properties $SP^{(1)}_1, SP^{(1)}_2$ is a file name ("texture= rubber_red.tx") of a texture of the first object OBJ.1.

The second static object dataset $SOD^{(2)}$ is defined in row A.3. It comprises the identifier $ID^{(2)}$ ("id=2") of the second object OBJ.2, and two static properties $SP^{(2)}_1, SP^{(2)}_2$, where the first of the two static properties $SP^{(2)}_1, SP^{(2)}_2$ is a file name ("mod=lamp.3d") of a three-dimensional model of the second object OBJ.2, and where the second of the two static properties $SP^{(2)}_1, SP^{(2)}_2$ is a file name ("texture= cloth_blue.tx") of a texture of the second object OBJ.2.

The third static object dataset $SOD^{(3)}$ is defined in row A.4. It comprises the identifier $ID^{(3)}$ ("id=3") of the third object OBJ.3, and a static property $SP^{(3)}_1$ of the third object OBJ.3, where the static property $SP^{(3)}_1$ is a file name ("mod=table.3d") of a three-dimensional model of the third object OBJ.3.

In this example embodiment, both the three-dimensional models and the textures are just links to datasets, or rather just file names of datasets, that define these models or these textures. Alternatively, datasets that define these models or these textures can also be included directly as static properties $SP_{(1)1}, \ldots, SP_{(3)1}$.

The various dynamic sub-data structures DDS.1, ..., DDS.3 are explained below with reference to the first dynamic sub-data structure DDS.1, which appears in the rows A.7 to A.11. The first dynamic sub-data structure DDS.1 comprises in row A.7 an identifier FID.1 of a first frame ("id=0"), and hence describes the first state ST.1 of a VR environment. This description is made by three dynamic object datasets $DOD^{(1)}$ (FID.1), ..., $DOD^{(3)}$ (FID.1).

The first of the three dynamic object datasets $DOD^{(1)}$ (FID.1), ..., $DOD^{(3)}$ (FID.1) comprises the identifier $ID^{(1)}$ of the first object OBJ.1 ("id=1"), and also the first dynamic property $DP^{(1)}_1$ (FID.1) ("pos=(0.0,0.0,0.0)"), which defines the position of the first object OBJ.1 in the first frame, and the second dynamic property $DP^{(1)}_2$ (FID.1) ("vel=(1.0,0.0,0.0)"), which defines the velocity of the first object OBJ.1 in the first frame.

The second of the three dynamic object datasets $DOD^{(1)}$ (FID.1), ..., $DOD^{(3)}$ (FID.1) comprises the identifier $ID^{(2)}$ of the second object OBJ.2 ("id=2"), and also the first dynamic property $DP^{(2)}_1$ (FID.1) ("pos=(0.0,0.0,1.0)"), which defines the position of the second object OBJ.2 in the first frame, and the second dynamic property $DP^{(2)}_2$ (FID.1) ("light=0"), which defines that the second OBJ.2 is not emitting any light.

The third of the three dynamic object datasets $DOD^{(1)}$ (FID.1), ..., $DOD^{(3)}$ (FID.1) comprises the identifier $ID^{(3)}$ of the third object OBJ.3 ("id=3"), and the first dynamic property $DP^{(3)}_1$ (FID.1) ("pos=(0.0,0.0,-1.0)"), which defines the position of the third object OBJ.3 in the first frame.

Figure 3:
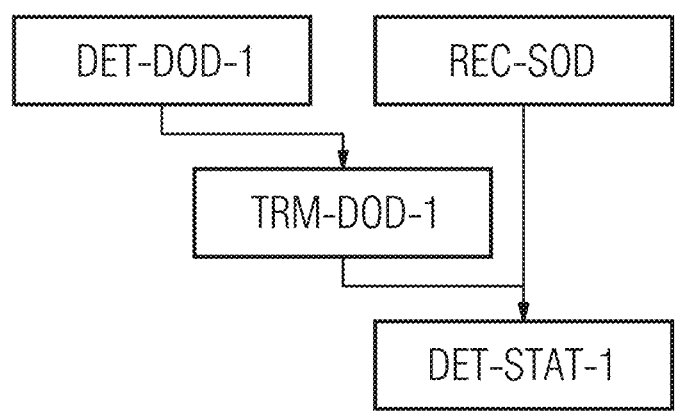
FIG. 3 is a flow diagram of a first example embodiment of a method for transferring a state from a first VR environment to a second VR environment.

FIG. 3 shows a flow diagram of a first example embodiment of a method for transferring a state ST.1, ..., ST.4 from a first VR environment to a second VR environment.

A step of the first example embodiment is receiving REC-SOD, via a receiving system RSYS, a static object dataset $SOD^{(1)}$, ..., $SOD^{(3)}$ relating to the object OBJ.1, ..., OBJ.3, where the object OBJ.1, ..., OBJ.3 can be represented in a first VR environment, which is generated by a sending system SSYS, and in the second VR environment, which is generated by the receiving system RSYS. The static object dataset $SOD^{(1)}$, ..., $SOD^{(3)}$ is received REC-SOD in this case via the interface RSYS.IF of the receiving system RSYS.

In this example embodiment, the static object dataset $SOD^{(1)}$, ..., $SOD^{(3)}$ relates to at least one static property $SP^{(1)}_1$, ..., $SP^{(3)}_1$ of the object OBJ.1, ..., OBJ.3, where the static property $SP^{(1)}_1$, ..., $SP^{(3)}_1$ of the object OBJ.1, ..., OBJ.3 cannot be changed by an interaction of a user with the first VR environment. The static object dataset $SOD^{(1)}$, ..., $SOD^{(3)}$ relates to the static property $SP^{(1)}_1$, ..., $SP^{(3)}_1$ of the object OBJ.1, ..., OBJ.3, given that the static object dataset $SOD^{(1)}$, ..., $SOD^{(3)}$ comprises the static property $SP^{(1)}_1$, ..., $SP^{(3)}_1$ of the object OBJ.1, ..., OBJ.3. In this example embodiment, the static object dataset $SOD^{(1)}$, ..., $SOD^{(3)}$ also comprises an identifier $ID^{(1)}$, ..., $ID^{(3)}$ of the object OBJ.1, ..., OBJ.3 that has the static property $SP^{(1)}_1$, ..., $SP^{(3)}_1$ which the static object dataset relates to, or comprises.

In this example embodiment, a static property $SP^{(1)}_1$, ..., $SP^{(3)}_1$ of an object OBJ.1, ..., OBJ.3 may be, or may comprise, in particular a three-dimensional model of the object OBJ.1, ..., OBJ.3, one or more textures of the object OBJ.1, ..., OBJ.3, or a constant physical property of the object OBJ.1, ..., OBJ.3.

In the first example embodiment, the static object dataset $SOD^{(1)}$, ..., $SOD^{(3)}$ is transmitted or sent from the sending system SSYS to the receiving system RSYS. Alternatively, the static object dataset $SOD^{(1)}$, ..., $SOD^{(3)}$ can also be received by a server SRV.

A further step of the first example embodiment is determining DET-DOD-1, via the sending system SSYS, a first dynamic object dataset $DOD^{(1)}$ (FID.1) relating to the object OBJ.1, ..., OBJ.3, wherein the first dynamic object dataset $DOD^{(1)}$ (FID.1) relates to a dynamic property $DP^{(1)}_1$ (FID.1), $DP^{(1)}_2$ (FID.1) of the object OBJ.1, ..., OBJ.3 in the first VR environment. In this example embodiment, the invention is explained with reference to the first dynamic object dataset $DOD^{(1)}$(FID.1), although the method can also be applied to other first dynamic object datasets $DOD^{(2)}$ (FID.1), $DOD^{(3)}$ (FID.1), $DOD^{(1)}$ (FID.2), $DOD^{(2)}$ (FID.3), $DOD^{(3)}$ (FID.3).

The first dynamic object dataset $DOD^{(1)}$ (FID.1) relates to a dynamic property $DP^{(1)}_1$ (FID.1), $DP^{(1)}_2$ (FID.1) in particular when the first dynamic object dataset $DOD^{(1)}$ (FID.1) comprises the dynamic property $DP^{(1)}_1$ (FID.1), $DP^{(1)}_2$ (FID.1). The first dynamic object dataset $DOD^{(1)}$ (FID.1) in particular also comprises an identifier $ID^{(1)}$ of the object OBJ.1, ..., OBJ.3 that has the dynamic property $DP^{(1)}_1$ (FID.1), $DP^{(1)}_2$ (FID.1) which the dynamic object dataset relates to, or comprises.

In this example embodiment, the first dynamic object dataset $DOD^{(1)}$ (FID.1) comprises a plurality of dynamic properties $DP^{(1)}_1$ (FID.1), $DP^{(1)}_2$ (FID.1). Alternatively, the first dynamic object dataset $DOD^{(1)}$ (FID.1) may also comprise just one dynamic property $DP^{(1)}_1$ (FID.1), $DP^{(1)}_2$ (FID.1). In the example embodiment shown, the first dynamic object dataset $DOD^{(1)}$ (FID.1) is moreover part of a dynamic sub-data structure DDS.1, and apart from the first dynamic object dataset $DOD^{(1)}$ (FID.1), the dynamic sub-data structure DDS.1 does not comprise another first dynamic object dataset having the same identifier $ID^{(1)}$ as the first dynamic object dataset $DOD^{(1)}$ (FID.1). Alternatively, and in particular in the case in which the first dynamic object dataset $DOD^{(1)}$ (FID.1) comprises just one dynamic property $DP^{(1)}_1$ (FID.1), $DP^{(1)}_2$ (FID.1), it is also possible for a plurality of first dynamic object datasets comprising an identical identifier $ID^{(1)}$ to be part of a dynamic sub-data structure DDS.1.

In this example embodiment, the dynamic property $DP^{(1)}_1$ (FID.1), $DP^{(1)}_2$ (FID.1) of the object OBJ.1, ..., OBJ.3 can be changed by an interaction of a user with the first VR environment. The interaction may be a direct interaction with the object OBJ.1, ..., OBJ.3 (e.g. moving the object OBJ.1, ..., OBJ.3), or an indirect interaction with the object OBJ.1, ..., OBJ.3, in which another object OBJ.1, ..., OBJ.3 interacts with the object OBJ.1, ..., OBJ.3, and the user interacts directly or indirectly with the other object OBJ.1, ..., OBJ.3. In this example embodiment, dynamic properties $DP^{(1)}_1$ (FID.1), $DP^{(1)}_2$ (FID.1) of the object OBJ.1, ..., OBJ.3 are, for example, the position and/or orientation of the object OBJ.1, ..., OBJ.3, the visibility of the object OBJ.1, ..., OBJ.3, a link between the object and another object OBJ.1, ..., OBJ.3, and/or a light parameter of the object OBJ.1, ..., OBJ.3.

A further step of the example embodiment shown is transmitting TRM-DOD-1 the first dynamic object dataset $DOD^{(1)}$ (FID.1) from the sending system SSYS to the receiving system RSYS. The transmitting TRM-DOD-1 is performed via an interface SSYS.IF of the sending system SSYS and an interface RSYS.IF of the receiving system RSYS.

The final step of the first example embodiment shown is determining DET-STAT-1, via the receiving system RSYS, in particular via a processing unit RSYS.CU of the receiving system RSYS and/or an output unit RSYS.OU of the receiving system RSYS, a first state ST.1, ..., ST.4 of the second VR environment on the basis of the static object dataset $SOD^{(}$, ..., $SOD^{(3)}$ and the first dynamic object dataset $DOD^{(1)}$ (FID.1). The determining DET-STAT-1 of the first state ST.1, . . . , ST.4 of the second VR environment comprises rendering the object OBJ.1, . . . , OBJ.3 on the basis of the static object dataset $SOD^{(1)}, \ldots, SOD^{(3)}$ and the first dynamic object dataset $DOD^{(1)}$ (FID.1), in particular on the basis of the static properties $SP^{(1)}_1, \ldots, SP^{(3)}_1$ contained in the static object dataset $SOD^{(1)}, \ldots, SOD^{(3)}$ and the dynamic properties $DP^{(1)}_1$ (FID.1), $DP^{(1)}_2$ (FID.1) of the object OBJ.1, . . . , OBJ.3 contained in the first dynamic object dataset $DOD^{(1)}$ (FID.1).

Figure 4:
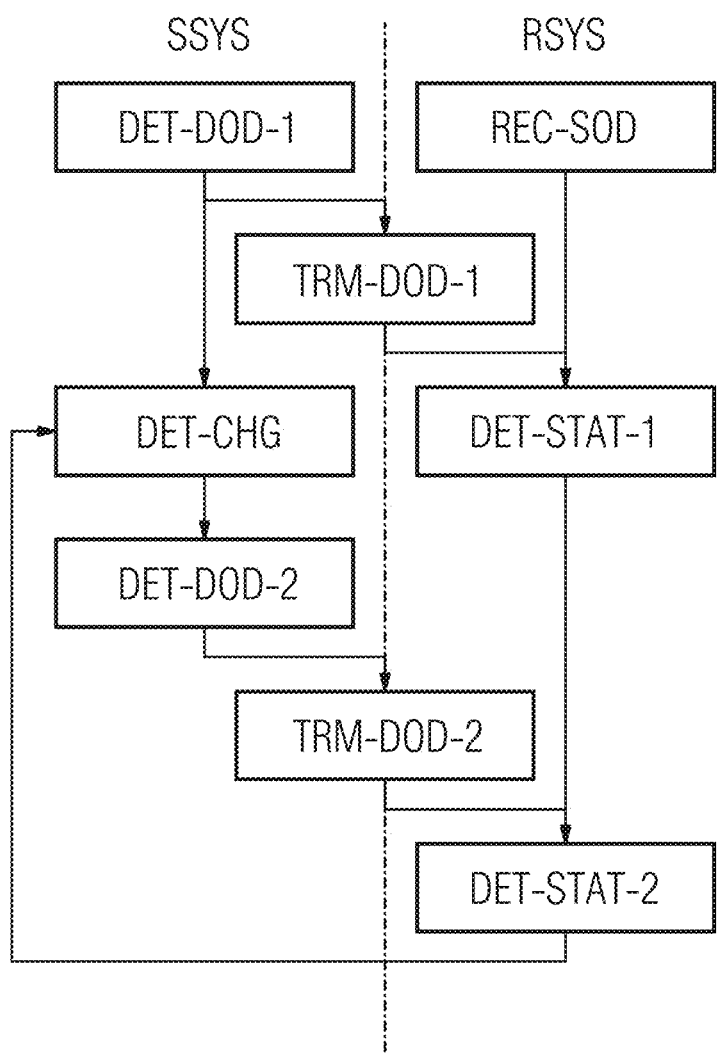
FIG. 4 is a flow diagram of a second example embodiment of a method for transferring a state from a first VR environment to a second VR environment.

FIG. 4 shows a flow diagram of a second example embodiment of a method for transferring a state ST.1, . . . , ST.4 from a first VR environment to a second VR environment. The second example embodiment includes all the steps of the first example embodiment, and in particular can comprise all the advantageous embodiments and developments of these steps.

The second example embodiment comprises as an additional step, detecting DET-CHG, via the sending system SSYS, a change in the dynamic property $DP^{(1)}_1$ (FID.1), . . . , $DP^{(3)}_1$ (FID.3) of the object OBJ.1, . . . , OBJ.3. In this example embodiment, the positions of all the objects OBJ.1, . . . , OBJ.3 in the first VR environment are ascertained via the sending system SSYS, for instance by simulation of the physical properties onto the respective objects OBJ.1, . . . , OBJ.3. In particular, this is a simple way to ascertain those objects OBJ.1, . . . , OBJ.3 for which there is a change in dynamic properties $DP^{(1)}_1$ (FID.1), . . . , $DP^{(3)}_1$ (FID.3) (e.g. as a result of an interaction with the user, or through the action of forces). Alternatively, the sending system SSYS can also store the dynamic properties $DP^{(1)}_1$ (FID.1), . . . , $DP^{(3)}_1$ (FID.3) of all the objects OBJ.1, . . . , OBJ.3 at one time instant, and ascertain the dynamic properties $DP^{(1)}_1$ (FID.1), . . . , $DP^{(3)}_1$ (FID.3) at a later time instant, and detect changes in the dynamic properties $DP^{(1)}_1$ (FID.1), . . . , $DP^{(3)}_1$ (FID.3) by comparing the dynamic properties $DP^{(1)}_1$ (FID.1), . . . , $DP^{(3)}_1$ (FID.3) for the two time instants.

It is assumed below that an object OBJ.1 having identifier $ID^{(1)}$ has a first dynamic property $DP^{(1)}_1$ (FID.1) in a first frame FID.1, and a second dynamic property $DP^{(1)}_1$ (FID.2) in a second frame (FID.2), where the first dynamic property $DP^{(1)}_1$ (FID.1) and the second dynamic property $DP^{(1)}_1$ (FID.2) differ, and therefore a change has been detected.

The second example embodiment further comprises determining DET-DOD-2, via the sending system SSYS, a second dynamic object dataset $DOD^{(1)}$ (FID.2) relating to the object OBJ.1, wherein the second dynamic object dataset $DOD^{(1)}$ (FID.2) relates to a dynamic property $DP^{(1)}_1$ (FID.2) of the object OBJ.1 in the first VR environment. The determining DET-DOD-2 of the second dynamic object dataset $DOD^{(1)}$ (FID.2) takes place in response to the detection DET-CHG of the change in the dynamic property $DP^{(1)}_1$ (FID.2) of the object OBJ.1, and in particular, the second dynamic object dataset $DOD^{(1)}$ (FID.2) comprises the changed dynamic property $DP^{(1)}_1$ (FID.2) of the object OBJ.1.

The second dynamic object dataset $DOD^{(1)}$ (FID.2) in particular can comprise all the advantageous embodiments and developments that have been described for the first example embodiment relating to the first dynamic object dataset $DOD^{(1)}$ (FID.1).

A further step of the second example embodiment shown is transmitting TRM-DOD-2 the second dynamic object dataset $DOD^{(1)}$ (FID.2) from the sending system SSYS to the receiving system RSYS. The transmitting TRM-DOD-2 is performed via the interface SSYS.IF of the sending system SSYS and the interface RSYS.IF of the receiving system RSYS.

The final step of the second example embodiment shown is determining DET-STAT-2, via the receiving system RSYS, in particular via the processing unit RSYS.CU of the receiving system RSYS and/or the output unit RSYS.OU of the receiving system RSYS, a second state ST.1, . . . , ST.4 of the second VR environment on the basis of the static object dataset $SOD^{(1)}, \ldots, SOD^{(3)}$ and the second dynamic object dataset $DOD^{(1)}$ (FID.2). The determining DET-STAT-2 of the second state ST.1, . . . , ST.4 of the second VR environment comprises rendering the object OBJ.1, . . . , OBJ.3 on the basis of the static object dataset $SOD^{(1)}, \ldots, SOD^{(3)}$ and the second dynamic object dataset $DOD^{(1)}$ (FID.2), in particular on the basis of the static properties $SP^{(1)}_1, \ldots, SP^{(3)}_1$ contained in the static object dataset $SOD^{(1)}, \ldots, SOD^{(3)}$ and the dynamic properties $DP^{(1)}_1$ (FID.2) of the object OBJ.1 that are contained in the second dynamic object dataset $DOD^{(1)}$ (FID.2).

In the second example embodiment shown, the second dynamic object dataset $DOD^{(1)}$ (FID.2) comprises only dynamic properties $DP^{(1)}_1$ (FID.2) of the object OBJ.1 that have been changed in relation to an earlier state ST.1, . . . , ST.4. Alternatively, the second dynamic object dataset $DOD^{(1)}$ (FID.2) can comprise further dynamic properties of the object OBJ.1 that have not been changed in relation to the earlier state ST.1, . . . , ST.4.

After the step of determining DET-STAT-2 the second state ST.1, . . . , ST.4 of the second VR environment, optionally the step of detecting DET-CHG, via the sending system SSYS, a change in the dynamic property $DP^{(1)}_1$ (FID.1), . . . , $DP^{(3)}_1$ (FID.3) of the object OBJ.1, . . . , OBJ.3, and all the subsequent steps, can be performed again, or iteratively, in particular until all the dynamic properties $DP^{(1)}_1$ (FID.1), . . . , $DP^{(3)}_1$ (FID.3) of all the objects OBJ.1, . . . , OBJ.3 have been checked, or until a new frame is available in the first VR environment.

Advantageously, all the changes in dynamic properties $DP^{(1)}_1$ (FID.1), . . . , $DP^{(3)}_1$ (FID.3) that arise within a frame, are processed, in the step of determining DET-DOD-2 a dynamic object dataset $DOD^{(1)}$ (FID.1), . . . , $DOD^{(3)}$ (FID.3), in one or more dynamic object datasets $DOD^{(1)}$ (FID.1), . . . , $DOD^{(3)}$ (FID.3), which, in the step of transferring TRM-DOD-2, are transferred jointly from the sending system SSYS to the receiving system RSYS.

Figure 5:
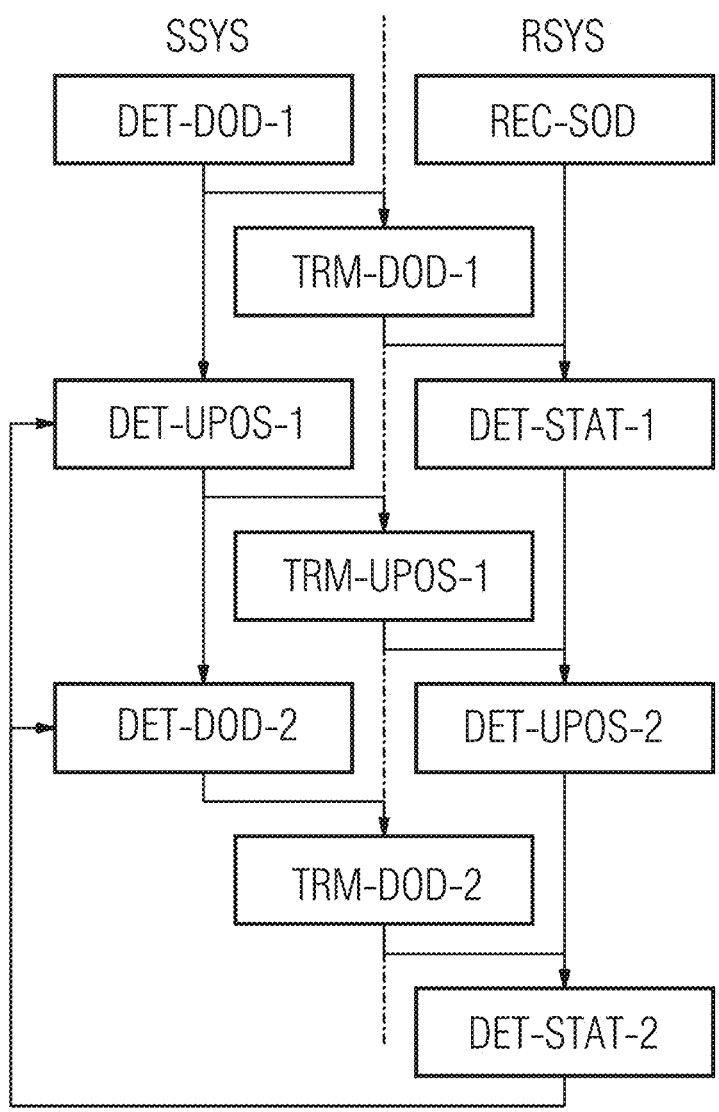
FIG. 5 is a flow diagram of a third example embodiment of a method for transferring a state from a first VR environment to a second VR environment.

FIG. 5 shows a flow diagram of a third example embodiment of a method for transferring a state ST.1, . . . , ST.4 from a first VR environment to a second VR environment. The third example embodiment includes several or all of the steps of the first example embodiment and of the second example embodiment, and in particular can comprise all the advantageous embodiments and developments of these steps.

The third example embodiment in particular comprises determining DET-UPOS-1, via the sending system SSYS, in particular via the processing unit SSYS.CU of the sending system SSYS, a first virtual user-position of a user in the first VR environment. In particular, additional sensors of the sending system SSYS are used for determining DET-UPOS-1 the first virtual user-position. Via the sensors it is possible in particular to convert a real movement of the user in the first VR environment into a virtual movement or a virtual position of the first user in the first VR environment.

The third example embodiment further comprises transmitting TRM-UPOS-1 the first virtual user-position from the sending system SSYS to the receiving system RSYS, in particular using the interface SSYS.IF of the sending system SSYS and the interface RSYS.IF of the receiving system RSYS. In particular, the first virtual user-position can be transferred also as a dynamic object dataset DOD (1) (FID.1), ..., DOD (3) (FID.3) of an object OBJ.1, ..., OBJ.3, in particular of an object OBJ.1, ..., OBJ.3 representing a user in the first VR environment or in the second VR environment.

The third example embodiment further comprises determining DET-UPOS-2 a second virtual user-position of a user in the second VR environment on the basis of the first user-position. In this example embodiment, the second virtual user-position of the user in the second VR environment is equivalent to the first virtual user-position of the user in the first VR environment (the technical term is "first person view"). Alternatively, the second virtual user-position of the user in the second VR can also be produced by a constant offset of the first virtual user-position of the user in the first VR environment, in which case the user of the second VR environment can in particular also perceive the user of the first VR environment as an object OBJ.1, ..., OBJ.3 (the technical term is "third person view").

In the third example embodiment, determining DET-STAT-1, DET-STAT-2 the first state and/or the second state ST.1, ..., ST.4 of the second VR environment is based additionally on the second user-position. In particular, rendering the second VR environment can be based on the second user-position by using the second user-position as the origin for the rendering.

Figure 6:
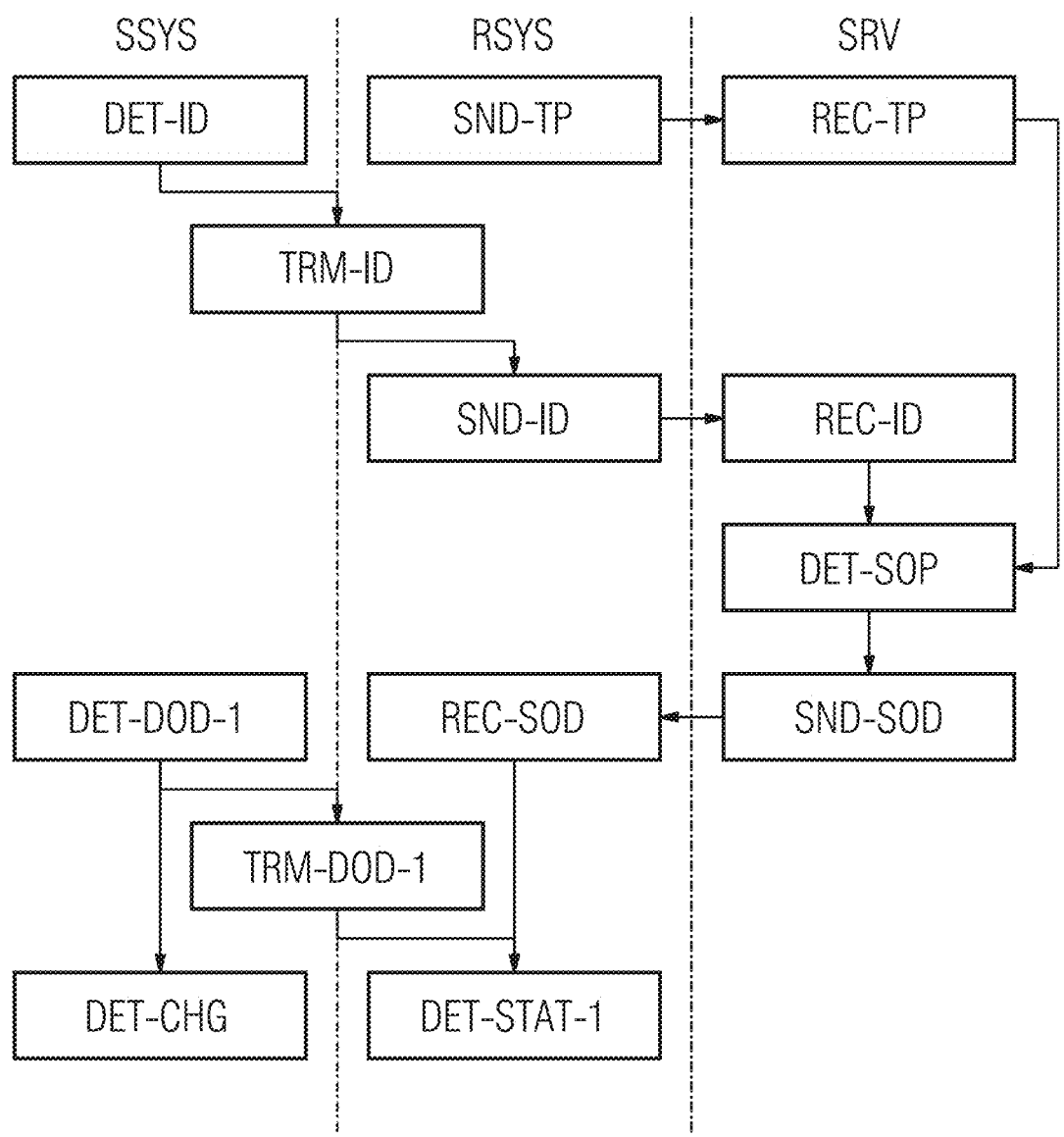
FIG. 6 is a flow diagram of a fourth example embodiment of a method for transferring a state from a first VR environment to a second VR environment.

FIG. 6 shows a flow diagram of a fourth example embodiment of a method for transferring a state ST.1, ..., ST.4 from a first VR environment to a second VR environment. The third example embodiment includes several or all of the steps of the first example embodiment and of the second example embodiment, and in particular can comprise all the advantageous embodiments and developments of these steps.

The fourth example embodiment further comprises sending SND-TP a technical parameter TP.1, TP.2 of the receiving system RSYS to a server SRV via the receiving system RSYS, in particular via an interface RSYS.IF of the receiving system RSYS, and receiving REC-TP the technical parameter TP.1, TP.2 of the receiving system RSYS via the server SRC, in particular via an interface SRV.IF of the server SRV. In this example embodiment, the technical parameter TP.1, TP.2 describes the representation capability of the receiving system RSYS and in particular comprises the processing power of a processing unit RSYS.CU of the receiving system RSYS, in particular of a CPU and/or GPU of the receiving system RSYS (for example the number of floating point operations that can be performed by the CPU and/or the GPU), and also the memory capacity of a memory unit RSYS.MU of the receiving system RSYS, in particular of a random access memory of the receiving system RSYS.

The fourth example embodiment further comprises determining DET-ID, via the sending system SSYS, an identifier of an object OBJ.1, ..., OBJ.3, in particular of an object OBJ.1, ..., OBJ.3 in the first VR environment, transmitting TRM-ID the identifier of the object OBJ.1, ..., OBJ.3 from the sending system SSYS to the receiving system RSYS, sending SND-ID, via the receiving system RSYS, the identifier of the object to a server SRV OBJ.1, ..., OBJ.3, and receiving REC-ID the identifier of the object OBJ.1, ..., OBJ.3 via the server SRV. Determining DET-ID the identifier is performed in particular via a processing unit SSYS.CU of the sending system SSYS. Transmitting TRM-ID the identifier, sending SND-ID the identifier, and receiving REC-ID are performed in particular via interfaces SSYS.IF, RSYS.IF, SRV of the units involved SSYS, RSYS, SRV.

When determining DET-ID the identifier, in particular it is also possible to determine the identifiers of a set, or of all, of the objects OBJ.1, ..., OBJ.3 in the first VR environment. Likewise when transmitting TRM-ID the identifier, it is also possible to transmit the identifiers of the set, or of all, of the objects OBJ.1, ..., OBJ.3 in the first VR environment. When sending SND-ID the identifier, is it also possible in particular to transmit the identifiers of the set, or of all, of the objects OBJ.1, ..., OBJ.3 in the first VR environment. When receiving REC-ID the identifier, in particular it is also possible to transmit the identifiers of the set, or of all, of the objects OBJ.1, ..., OBJ.3 in the first VR environment.

In particular, the identifiers of the objects OBJ.1, ..., OBJ.3 can be part of a static sub-data structure SDS, wherein the static sub-data structure SDS in particular can be a component of a data structure DS according to the invention.

The fourth example embodiment shown also comprises determining DET-SOD, via the server SRV, in particular via a processing unit SRV.CU of the server SRV, a static object dataset $SOD^{(1)}$, ..., $SOD^{(3)}$ on the basis of the technical parameter TP.1, TP.2 and the identifier. In this process, the static object dataset $SOD^{(1)}$, ..., $SOD^{(3)}$ is adapted to the technical parameter TP.1, TP.2 of the receiving system RSYS. In particular, the server SRV can in this case store, in particular in a database, different static object datasets $SOD^{(1)}$, ..., $SOD^{(3)}$ (e.g. three-dimensional models having different spatial resolutions, or textures having different resolutions) and associated minimum technical parameters for each identifier. The minimum technical parameters have the same structure as the transmitted technical parameters TP.1, TP.2; thus in this example embodiment, the minimum technical parameter likewise specifies a processing power and a memory capacity.

If a minimum technical parameter is associated with a static object dataset $SOD^{(1)}$, ..., $SOD^{(3)}$, then the processing power of the minimum technical parameter denotes a minimum processing power that is needed in a receiving system RSYS to represent the associated object OBJ.1, ..., OBJ.3 on the basis of the static object dataset $SOD^{(1)}$, ..., $SOD^{(3)}$. In addition, the memory capacity of the minimum technical parameter denotes a minimum memory capacity that is needed in a receiving system RSYS to represent the associated object OBJ.1, ..., OBJ.3 on the basis of the static object dataset $SOD^{(1)}$, ..., $SOD^{(3)}$. The minimum technical parameter may also comprise in particular the graphics engine used. Examples of such graphics engines are "Unity" or "Unreal".

In this example embodiment, in the step of determining DET-SOD the static object dataset $SOD^{(1)}$, ..., $SOD^{(3)}$, a static object dataset $SOD^{(1)}$, ..., $SOD^{(3)}$ stored in the server SRV is then selected so that the received technical parameter TP.1, TP.2 satisfies the minimum technical parameter associated with the one of the static object datasets $SOD^{(1)}$, ..., $SOD^{(3)}$ stored in the server SRV. For this purpose, in this example embodiment, the processing power and the memory capacity in the technical parameter TP.1, TP.2 respectively must be greater than the processing power and memory capacity in the minimum technical parameter.

Comparing the technical parameter TP.1, TP.2 and the minimum technical parameter, and hence also determining DET-SOD the static object dataset $SOD^{(1)}$, ..., $SOD^{(3)}$, can obviously also be performed with any other structure of technical parameters TP.1, TP.2 or minimum technical parameters.

In particular if a plurality of identifiers ID of a plurality of objects OBJ.1, ..., OBJ.3 are received by the server SRV, all the minimum technical parameters associated with relevant static object datasets $SOD^{(1)}, \ldots, SOD^{(3)}$ can be taken into account in determining the static object dataset $SOD^{(1)}, \ldots, SOD^{(3)}$. For example, the static object datasets $SOD^{(1)}, \ldots, SOD^{(3)}$ can then be determined such that the technical parameter TP.1, TP.2 satisfies the sum of the respective minimum technical parameters. Instead of the sum, it is also possible to select other functions of the respective minimum technical parameters (e.g. the mean value), in particular different functions for different elements of the minimum technical parameters.

In the example embodiment shown, receiving REC-SOD the static object dataset $SOD^{(1)}, \ldots, SOD^{(3)}$ is carried out in response to sending SND-ID the identifier ID of the object OBJ.1, ..., OBJ.3. In other words, the receiving system RSYS first sends the identifier ID of the object OBJ.1, ..., OBJ.3 to the server SRV, and then the receiving system RSYS receives REC-SOD the static object dataset $SOD^{(1)}, \ldots, SOD^{(3)}$. Between the sending SND-ID of the identifier ID of the object OBJ.1, ..., OBJ.3 and the receiving REC-SOD of the static object dataset $SOD^{(1)}, \ldots, SOD^{(3)}$, the server SRV can obviously perform further steps, as is shown in this example embodiment.

Figure 7:
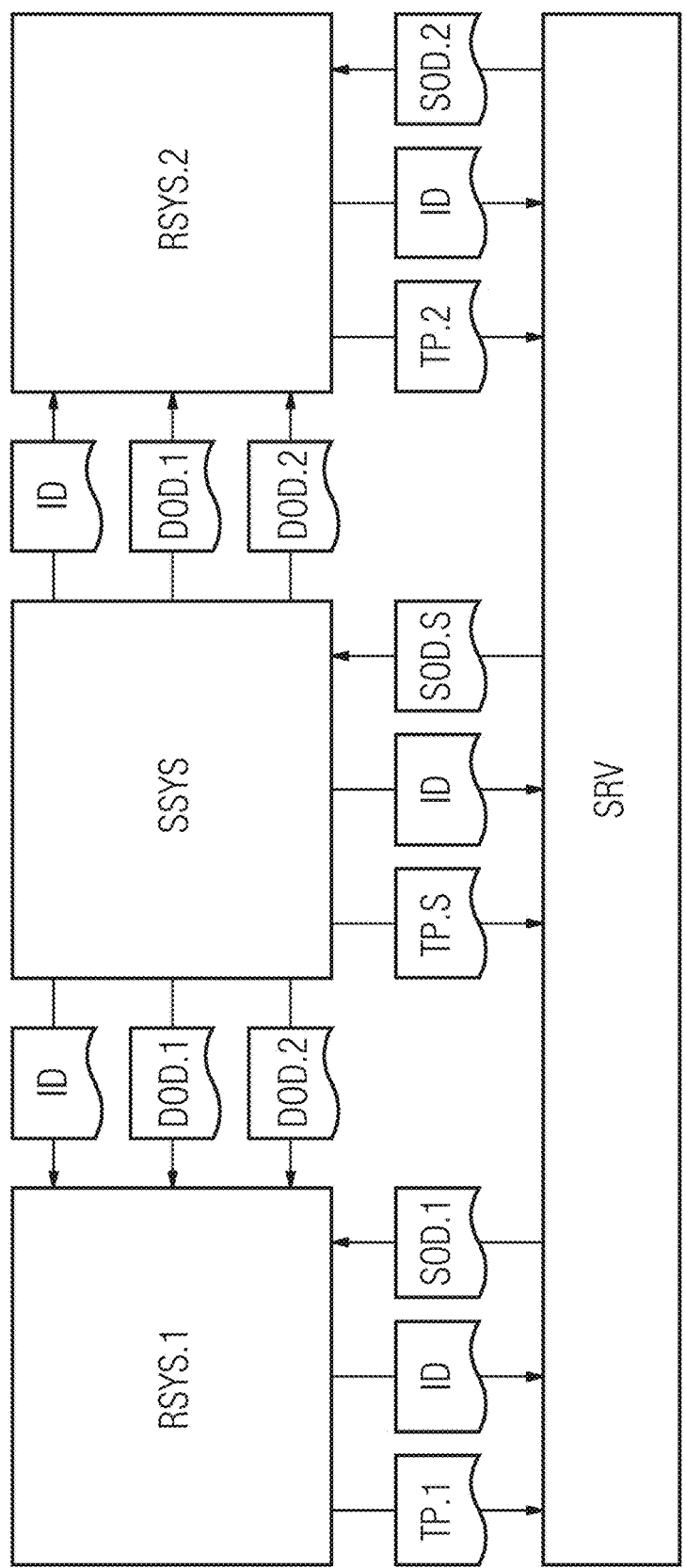
FIG. 7 is a data flow diagram of the example embodiment of the method shown in FIG. 6.

FIG. 7 shows a data flow diagram of the example embodiment of the method shown in FIG. 6. In this data flow diagram, a data transfer takes place between the sending system SSYS, two receiving systems RSYS.1, RSYS.2 and a server SRV. The transferred data is depicted between the sending system SSYS and the receiving system RSYS.1, RSYS.2 in the order of transfer from top to bottom, and between the sending system SSYS, or respectively the receiving systems RSYS.1, RSYS.2, and the server SRV in the order of transfer from left to right.

In this data flow diagram, the receiving systems RSYS.1, RSYS.2 send SND-TP a technical parameter TP.1, TP.2 of the associated receiving system RSYS.1, RSYS.2 to the server SRV. Optionally, the sending system SSYS also sends a technical parameter TP.S of the sending system SSYS to the server SRV. In addition in this data flow diagram, the sending system SSYS transmits TRM-ID the identifier ID of one or more objects OBJ.1, ..., OBJ.3 to the various receiving systems RSYS.1, RSYS.2. These send SND-ID this identifier ID to the server SRV. In this example embodiment, the sending system SSYS also optionally sends an identifier ID of one or more objects OBJ.1, ..., OBJ.3 to the server SRV.

In response to receiving REC-ID the identifier ID, the server SRV sends SND-SOD to the associated receiving system RSYS.1, RSYS.2, and to the sending system SSYS, a static object dataset SOD.1, SOD.2, SOD.S adapted to the associated technical parameter TP.1, TP.2, TP.S. The receiving systems RSYS.1, RSYS.2 and the sending system SSYS use the static object datasets SOD.1, SOD.2, SOD.S to represent the object OBJ.1, ..., OBJ.3 in the associated VR environment.

Once the respective static object datasets SOD.1, SOD.2 are present in the receiving systems RSYS.1, RSYS.2, dynamic object datasets DOD.1, DOD.2 are transmitted from the sending system SSYS to the receiving systems RSYS.1, RSYS.2. The receiving systems RSYS.1, RSYS.2 (and also the sending system SSYS) can then represent the associated VR environment on the basis of the respective static object datasets SOD.1, SOD.2, SOD.S and the respective dynamic object datasets DOD.1, DOD.2.

Figure 8:
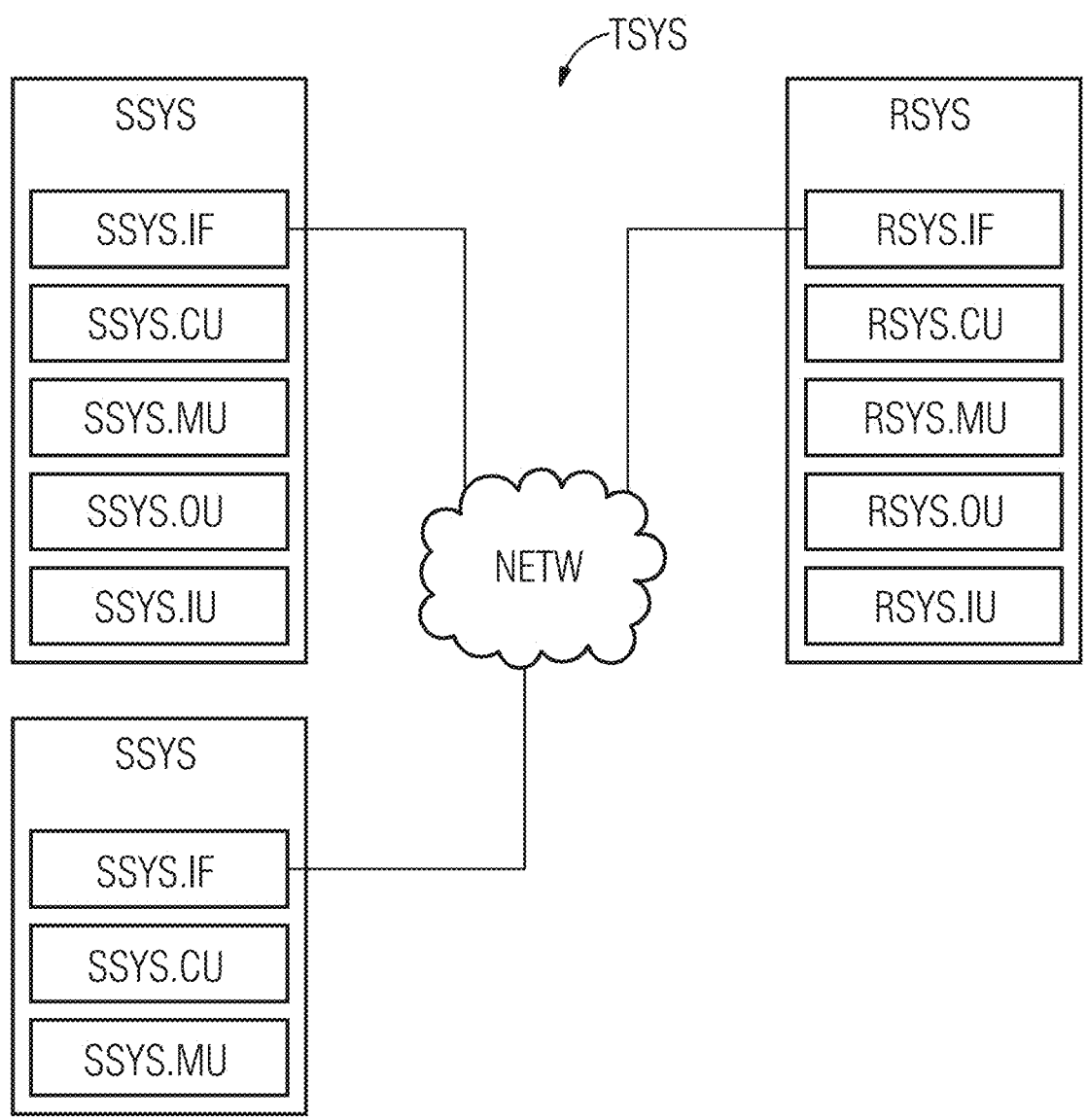
FIG. 8 is a block diagram of a transfer system.

FIG. 8 shows a block diagram of a transfer system TSYS system comprising a sending system SSYS, a receiving system RSYS, and an optional server SRV. The sending system SSYS comprises an interface SSYS.IF, a processing unit SSYS.CU, a memory unit SSYS.MU, an input unit SSYS.IU, and an output unit SSYS.OU. The receiving system RSYS comprises an interface RSYS.IF, a processing unit RSYS.CU, a memory unit RSYS.MU, an input unit RSYS.IU, and an output unit RSYS.OU. The server SRV comprises an interface SRV.IF, a processing unit SRV.CU, and a memory unit SRV.MU.

The sending system SSYS and/or the receiving system RSYS in particular may be a computer, in particular a pair of video glasses. A technical term for video glasses is "head-mountable display" or "head-mounted display". The server SRV may be in particular a computer, a microcontroller or an integrated circuit. Alternatively, the server SRV may be a real or virtual interconnection of computers (a real interconnection is referred to as a "cluster" and a virtual interconnection is referred to as a "Cloud").

An interface SSYS.IF, RSYS.IF, SRV.IF may be a hardware or software interface (for instance PCI bus, USB or FireWire). An interface SSYS.IF, RSYS.IF, SRV.IF in particular may comprise a plurality of additional interfaces and/or sub-interfaces. A processing unit SSYS.CU, RSYS.CU, SRV.CU may comprise hardware elements or software elements, for instance a microprocessor or what is known as a field programmable gate array (FPGA). A processing unit SSYS.CU, RSYS.CU, SRV.CU in particular may comprise a plurality of processing units and/or processing sub-units. A memory unit SSYS.MU, RSYS.MU, SRV.MU may be implemented as a non-permanent main memory (random access memory or RAM for short) or as a permanent mass storage device (hard disk, USB stick, SD card, solid state disk). A memory unit SSYS.MU, RSYS.MU, SRV.MU in particular may comprise a plurality of additional memory units and/or memory sub-units.

An input unit SSYS.IO, RSYS.IO in particular may be a unit that allows a user to interact with a VR environment. The input unit SSYS.IO, RSYS.IO may be fitted to the user, be operated by the user and/or observe the user. The user can interact with the input unit SSYS.IO, RSYS.IO in particular by way of voice control or gesture control. Furthermore, the input unit SSYS.IO, RSYS.IO can alternatively or additionally detect the movements of the user (the technical term is "motion tracking"), for instance via an optical camera, in particular detect the movements of a hand or finger of the user ("finger tracking" and "hand tracking" respectively), or detect the eye movements of the user ("eye tracking"). The optical camera can be fastened to the user himself ("inside-out tracking"), or can observe the user from outside ("outside-in tracking"). The motion detection can be improved by using markers on the user. Apart from optical detectors, it is alternatively or additionally possible also to use acoustic detectors (e.g. ultrasound), electromagnetic detectors (e.g. current-carrying coils), inertial detectors (e.g. gyroscopes, accelerometers or magnetometers), or goniometers. Furthermore, the input unit SSYS.IO, RSYS.IO can also comprise physical controls, for instance a mouse, a keyboard or a joystick.

An output unit SSYS.OU, RSYS.OU in particular may be a unit that allows a representation of a VR environment. The output unit SSYS.OU, RSYS.OU may in particular be embodied as part of a pair of video glasses (also known as a "head-mountable display"). Known technologies for this purpose are "see-through displays" (where beam splitters are used to superimpose reality and virtual image) or screens that can be perceived by the human eye directly or via a projection ("head-mounted non-projective displays" and "head-mounted projective displays" respectively). As an alternative to the video glasses, the output unit can also be part of a projection system (for instance "Cave Automatic Virtual Environment", or CAVE). The respective screens can be embodied as OLED screens (acronym for "organic light emitting diode"), LCD screens (acronym for "liquid crystal display") or CLPL screens (acronym for "customized low persistence liquid").

The sending system SSYS, the receiving system RSYS and the server SRV are connected via a network NETW, in particular via the respective interfaces SSYS.IF, RSYS.IF, SRV.IF. The network NETW may be a local area network (LAN) or a wide area network (WAN). An example of a local area network is an intranet; an example of a wide area network is the Internet. The network NETW can be implemented in particular wirelessly, in particular as a WLAN (wireless LAN, commonly known as WiFi) or as a Bluetooth connection. The network NETW can also be implemented as a combination of the examples mentioned.

Even if not explicitly stated, individual example embodiments, or individual sub-aspects or features of these example embodiments, can be combined with, or substituted for, one other, if this is practical and within the meaning of the invention, without departing from the present invention. Without being stated explicitly, advantages of the invention that are described with reference to one example embodiment also apply to other example embodiments, where transferable.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for transferring a state from a first VR environment to a second VR environment, the method comprising:

receiving, via a receiving system, a static object dataset relating to an object, the object being representable in the first VR environment and in the second VR environment, the first VR environment generated by a sending system and the second VR environment generated by the receiving system;

determining, via the sending system, a first dynamic object dataset relating to a dynamic property of the object represented in the first VR environment;

transmitting the first dynamic object dataset from the sending system to the receiving system;

determining, via the receiving system, a first state of the second VR environment based on the static object dataset and the first dynamic object dataset;

determining, via the sending system, a first virtual user-position of a user in the first VR environment;

transmitting the first virtual user-position from the sending system to the receiving system; and determining a second virtual user-position of a user in the second VR environment based on the first virtual user-position, wherein the second virtual user-position is a user-position in the second VR environment that is offset from the first virtual user-position by a constant value.

2. The method of claim 1, further comprising:

determining, via the sending system, a second dynamic object dataset relating to the object, wherein the first dynamic object dataset relates to the dynamic property of the object at a first time instant in the first VR environment, and the second dynamic object dataset relates to the dynamic property of the object at a second time instant in the first VR environment;

transmitting the second dynamic object dataset to the receiving system; and determining, via the receiving system, a second state of the second VR environment based on the static object dataset and the second dynamic object dataset.

3. The method of claim 2, further comprising:

detecting a change in the dynamic property of the object, wherein the second dynamic object dataset is determined in response to detecting the change in the dynamic property of the object.

4. The method of claim 2, wherein the dynamic property of the object is changeable by an interaction of a user with the first VR environment.

5. The method of claim 4, wherein the dynamic property of the object relates to at least one of:

at least one of a position or an orientation of the object, a visibility of the object, a link between the object and another object, or a light parameter of the object.

6. The method of claim 2, wherein the static object dataset relates to at least one static property of the object, and the at least one static property of the object cannot be changed by an interaction of a user with the first VR environment.

7. The method of claim 6, wherein the at least one static property relates to at least one of:

a three-dimensional model of the object, one or more textures of the object, or a constant physical property of the object.

8. The method of claim 1, wherein the dynamic property of the object is changeable by an interaction of a user with the first VR environment.

9. The method of claim 8, wherein the dynamic property of the object relates to at least one of:
at least one of a position or orientation of the object,
a visibility of the object,
a link between the object and another object, or
a light parameter of the object.

10. The method of claim 1, wherein
the static object dataset relates to at least one static property of the object, and
the at least one static property of the object cannot be changed by an interaction of a user with the first VR environment.

11. The method of claim 10, wherein the at least one static property of the object relates to at least one of:
a three-dimensional model of the object,
one or more textures of the object, or
a constant physical property of the object.

12. The method of claim 1,
wherein determining of at least one of the first state of the second VR environment or a second state of the second VR environment is based on the second virtual user-position.

13. The method of claim 1, wherein at least one of the determining a first state of the second VR environment or determining of a second state of the second VR environment includes rendering the object.

14. The method of claim 1, further comprising:
sending, via the receiving system, a technical parameter of the receiving system to a server, wherein
the static object dataset is adapted to the technical parameter of the receiving system.

15. The method of claim 1, further comprising:
determining an identifier of the object via the sending system;
transmitting the identifier of the object to the receiving system; and
sending the identifier of the object to a server, wherein
the static object dataset is received in response to the sending the identifier of the object.

16. A non-transitory and tangible computer program product storing a computer program, which is directly loadable into a memory of a transfer system, the computer program including program segments to perform the method of claim 1 upon the program segments being executed by the transfer system.

17. A non-transitory computer-readable storage medium, storing program segments, which are readable and executable by a transfer system to perform the method of claim 1 upon the program segments being executed by the transfer system.

18. A non-transitory computer-readable storage medium storing a data structure for use in the method of claim 1, the data structure comprising a static sub-data structure and a dynamic sub-data structure,
wherein the static sub-data structure relates to static object datasets relating to objects,
wherein the dynamic sub-data structure includes dynamic object datasets, relating to the objects, and
wherein the state of a VR environment is representable based on the static object datasets and the dynamic object datasets.

19. A transfer system for transferring a state from a first VR environment to a second VR environment, the transfer system comprising:
a sending system configured to
generate the first VR environment,
determine a first dynamic object dataset relating to a dynamic property of an object representable in the first VR environment and in the second VR environment,
determine a first virtual user-position of a user in the first VR environment,
transmit the first dynamic object dataset and the first virtual user-position; and
a receiving system configured to
generate the second VR environment,
receive the first virtual user-position, the first dynamic object dataset and a static object dataset relating to the object,
determine a first state of the second VR environment based on the static object dataset and the first dynamic object dataset, and
determine a second virtual user-position of a user in the second VR environment based on the first virtual user-position, the second virtual user-position being a user-position in the second VR environment that is offset from the first virtual user-position by a constant value.

20. A computer-implemented method for determining a state of an object in a VR environment, the computer-implemented method comprising:
receiving a static object dataset relating to the object, the object being represented in the VR environment, and the VR environment being generated by a receiving system;
receiving a first dynamic object dataset relating to a dynamic property of the object in another VR environment;
determining a first state of the object in the VR environment based on the static object dataset and the first dynamic object dataset;
receiving a first virtual user-position of a user in the other VR environment; and
determining a second virtual user-position of a user in the VR environment based on the first virtual user-position of a user in the other VR environment; wherein
the second virtual user-position is a user-position in the VR environment that is offset from the first virtual user-position by a constant value.

* * * * *